Jan. 13, 1925. 1,523,367
W. PETERSEN ET AL
HIGH TENSION TRANSFORMER
Filed April 9, 1921   5 Sheets-Sheet 1
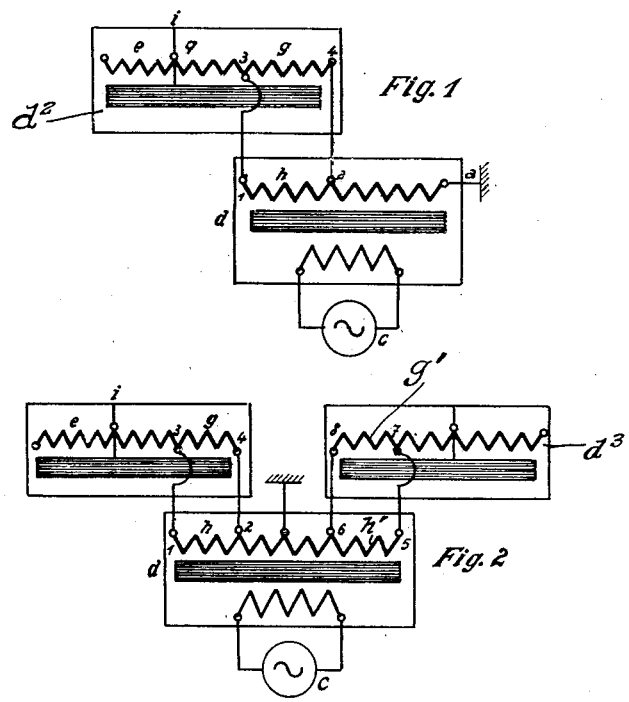
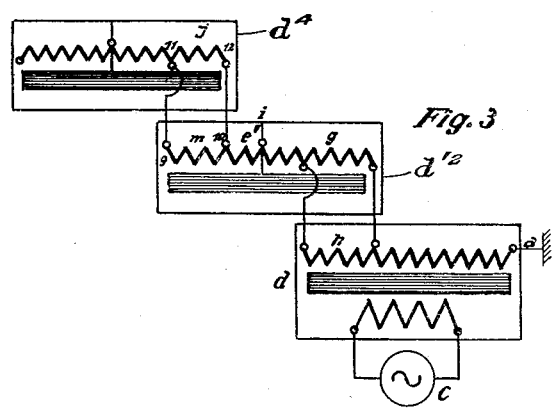
Inventors.
Waldemar Petersen,
Friedrich Dessauer,
Edward Welter,
By Watson, Coit, Morse & Grindle,
Attorneys.

Jan. 13, 1925.                                                          1,523,367
W. PETERSEN ET AL
HIGH TENSION TRANSFORMER
Filed April 9, 1921          5 Sheets-Sheet 3
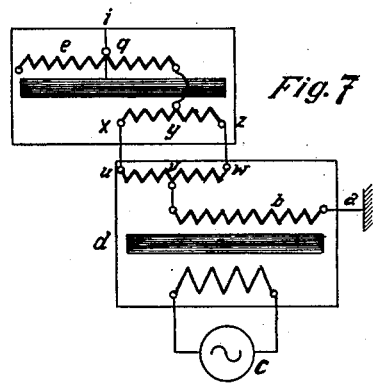
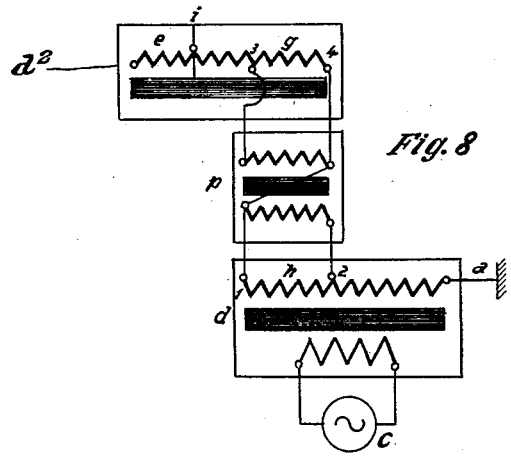

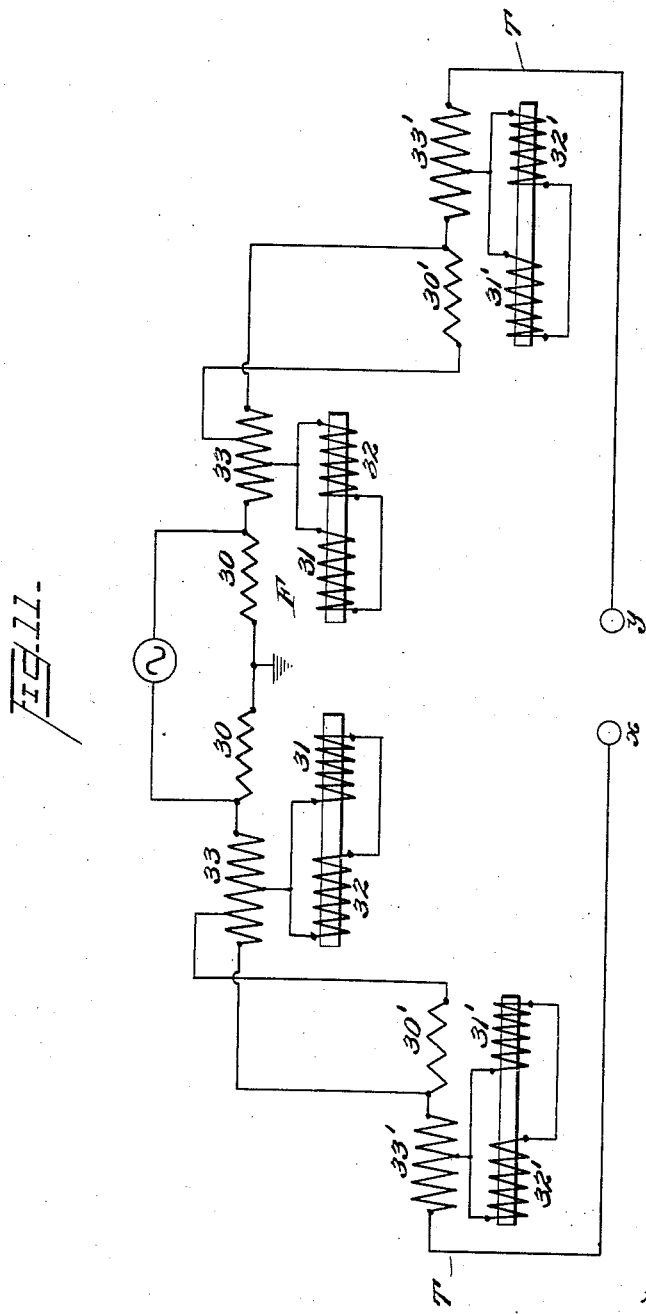

Patented Jan. 13, 1925.

1,523,367

UNITED STATES PATENT OFFICE.

WALDEMAR PETERSEN, OF DARMSTADT, FRIEDRICH DESSAUER, OF FRANKFORT-ON-THE-MAIN, AND EDUARD WELTER, OF DARMSTADT, GERMANY.

HIGH-TENSION TRANSFORMER.

Application filed April 9, 1921. Serial No. 460,069.

(GRANTED UNDER THE PROVISIONS OF THE ACT OF MARCH 3, 1921, 41 STAT. L., 1313.)

*To all whom it may concern:*

Be it known that we, WALDEMAR PETERSEN, FRIEDRICH DESSAUER, and EDUARD WELTER, German subjects, residing at Darmstadt, Frankfort-on-the-Main, and Darmstadt, Germany, have invented certain new and useful Improvements in a High Tension Transformer for which we have filed application as follows: Switzerland, Aug. 11th, 1919, 85,126, July 27th, 1920, 93,159; Sweden, Aug. 27th, 1920, 48,219, Sept. 8th, 1920, 49,619; Belgium, Sept. 20th, 1920, 291,198, Sept. 11th, 1920, 291,187; Austria, Sept. 22nd, 1920, 89,371, July 26th, 1920, 89,372; Spain, Sept. 27th, 1920, 75,729, July 31st, 1920, 75,111; France, Dec. 28th, 1920, 24,281, Sept. 28th, 1920, 23,548; Holland, July 29th, 1919, no patent issued, Aug. 6th, 1920, no patent issued; Hungary, Sept. 29th, 1920, no patent issued; Aug. 19th, 1920, no patent issued; Italy, Oct. 7th, 1920, no patent issued; Aug. 20th, 1920, no patent issued, of which the following is a specification.

This invention relates to high tension transformer systems, particularly of the nature and character shown in the patent to Friedrich Dessauer, No. 1,372,652, March 22, 1921. In this patent is disclosed an arrangement of transformers, in which the high tension windings of the individual units are connected in series to produce a very high voltage and in which is provided means for controlling and minimizing the potential difference existing between adjacent parts of the system so as to eliminate dangerously high potential differences and to reduce the quantity of insulation required.

The principal object of this invention is to provide an improved arrangement of transformers, either for step-up or step-down transformation, which is simpler, lighter, cheaper, and more compact, and which has greater working security than those heretofore known. More specifically, an object of the present invention is to provide a system of transformers which accomplishes the same results as those described in the above mentioned patent, but in which the necessity for a large number of parts, particularly auxiliary transformer units, is obviated. Another object is to provide a system as above described in which simpler and cheaper transformer units than those heretofore necessary may be used. Still another object is to increase the efficiency and improve the operation generally of the individual transformers used in the system.

Other purposes and objects will be apparent from the annexed description and accompanying drawings, in which:

Fig. 1 shows the invention applied to two transformers;

Fig. 2 shows the arrangement of Figure 1 made symmetrical on both sides of a grounded point;

Fig. 3 shows the arrangement of Figure 1 extended to include another transformation unit;

Figure 9:
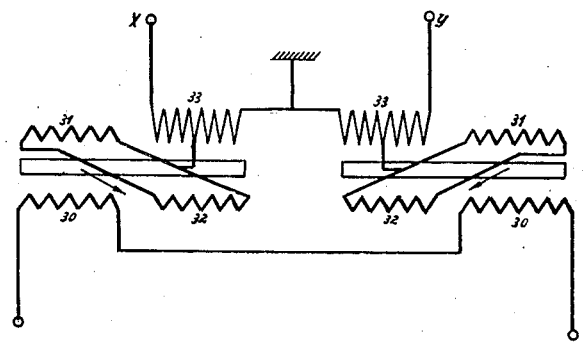
Figure 10:
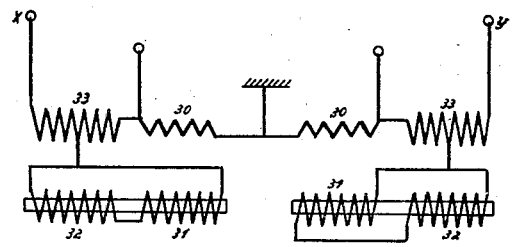

Figs. 4 to 8 inclusive show various modifications of the invention as applied in Figure 1;

Figs. 9 and 10 show the practical embodiment of the invention with a modified means of regulating the core potential; and Fig. 11 shows the modification of Figure 10 extended to include a series of transformation units.

The term "potential" as used herein denotes absolute potential or potential with respect to the earth, unless expressly stated otherwise, and when applied to coils or windings, "potential" refers to the maximum instantaneous potential of any turn of the winding. "High tension" and "low tension" as applied to windings are used in the customary sense of denoting a relatively high and relatively low potential difference or voltage respectively between terminals of the winding. "Connected in series" particularly as applied to the high tension windings, is intended to include any connection by which the voltages of the windings are added, irrespective of whether the windings are connected directly end to end, or are linked in series through intermediate windings or other apparatus. The term "transformer" includes either an auto-transformer or a through-transformer; "auto-transformer" means a transformer in which the primary and secondary windings are connected in series or in which the voltages of the two windings add; and "through-transformer" refers to a transformer in which energy can pass from the primary to the secondary winding only by inductive action, and not in the form of a current through a conductive connection. In a through-transformer, the primary and secondary windings may be "conductively isolated" or placed "in non-conductive relation" either by means of interposing insulation between the windings, or by having opposed electro-motive forces in the two windings, so that even should there be a metallic connection between the windings, current developed in one winding will not flow to the other.

Referring to the drawings, the embodiment of the invention shown in Fig. 1 comprises a through-transformer $d$ whose low tension winding is excited by any suitable source of supply $c$. The high tension winding has terminals 1 and $a$ and an intermediate contact 2. The section $h$ of the winding between 1 and 2 has any desired number of turns, but is preferably of very few turns as compared with the total high tension winding, and also preferably is of heavier wire than the portion 2—$a$, in order to carry a heavy current, as will be hereinafter explained. A second or succeeding transformer $d_2$ of the series is preferably an auto-transformer comprising a primary or low tension winding $g$, which is similar to $h$, and a secondary or high tension winding $e$ connected in series therewith. The terminals 3 and 4 of the winding $g$ are connected to 1 and 2 respectively, so that the primary $g$ is fed by the low voltage section $h$ of the high tension winding of transformer $d$. The core or casing, or both, of the second transformer $d$ is connected to the high tension winding $g$ at $q$ preferably its mid-point.

Thus the potential difference existing between any part of the winding and the casing or core cannot exceed half the voltage of the high tension winding. (It is assumed that the voltage of $g$ is negligible as compared with that of $e$). Likewise, it will be seen that the voltage of $e$ is added to that of the high tension winding 1—$a$ and since $a$ is grounded, the absolute potential of the core and casing of $d_2$ is mid-way between the absolute potential of the terminals of its high tension winding, that is, considerably less than the maximum potential of this winding. Therefore while the system has a voltage of twice that of the winding $g$, the latter has to be insulated from its casing and core for only one quarter of the voltage of the system. This effects enormous saving in insulation. Likewise the low tension winding need be insulated from the high tension winding only for half the voltage of the transformer unit. This latter consideration becomes important when through transformers are used instead of auto-transformers, as for instance in Figure 9. Of course the casing must be insulated from the earth for the potential of the point $q$, but this is simply and cheaply accomplished.

Assuming that the high tension current flowing from transformer $d$ to the winding $e$ does so by the path 1—3, then the winding section $h$ has to carry this current in addition to the magnetizing and load currents of the winding $g$. Consequently the windings $g$ and $h$ are of heavier wire than the sections 2—$a$ and $e$.

Figure 2 shows a system similar to that in Figure 1 but made symmetrical with respect to a grounded point. In this case the high tension winding of $d$ is grounded at its mid-point, the transformer $d_2$ being connected as in Figure 1 across the winding section $h$. At the opposite end, the high tension winding includes a section $h'$ similar to $h$, having terminals 5 and 6 connected to the terminals 7 and 8 of the winding $g'$ of a transformer $d_3$, which is similar in all respects to $d_2$.

The systems of Figures 1 and 2 can be extended indefinitely merely by the addition of "succeeding transformers." Figure 3 shows the system of Figure 1 extended to give a voltage of three times that of a single unit. The transformer $d'_2$ is similar to $d_2$, except that the high tension winding $e'$ includes a section $m$, similar to $g$, and having terminals 9 and 10. A second succeeding transformer $d_4$ is exactly similar to $d_2$ in Figure 1, and has the terminals 11 and 12 of its low tension winding $j$ connected to 9 and 10 respectively. Thus the high tension windings of all three transformers are connected in series, while each succeeding transformer of the system is excited from the preceding transformer, in this case from a portion of its high tension winding.

Through-transformers can be substituted for auto-transformers throughout the system if desired. For instance, in Figure 4, the succeeding transformer of the series has a low tension exciting winding $g_2$, separate from the high tension winding $e$, which is similar to the winding $e$ in Figure 1. In this case the winding $g_2$ is fed by the section $h$ of the first transformer, and the point 2 is connected to the end of the winding $e$, in order to add its voltage to that of the section 2—$a$ of transformer $d$. Likewise the winding section $h$ of the transformer $d$ may be made separate from the main winding and connected either across the section $g$ of the winding of an auto-transformer $d_2$ as in Figure 5, or across the primary winding $g_2$ of a through-transformer $d_4$, as in Figure 6.

Figure 4:
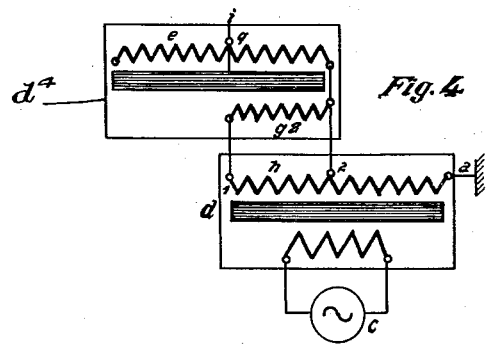
Figure 5:
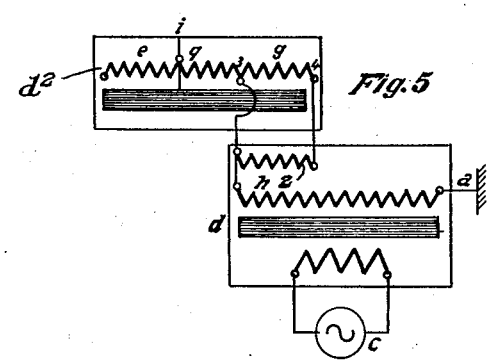
Figure 6:
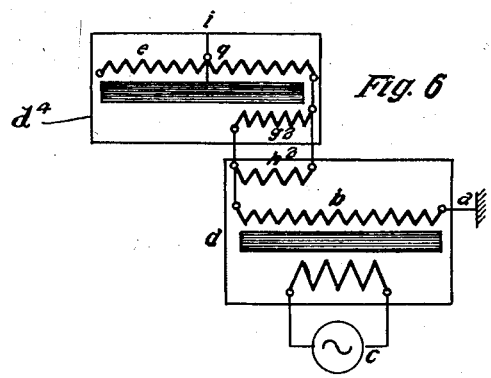

Figure 7 shows a further modification of the system, in effect a combination of Figures 1 and 6. In this arrangement, the section $u$—$v$ corresponds to the winding $h$ in Figure 1 while the section $v$—$w$ corresponds to $h_2$ in Figure 5. Likewise $y$—$z$ corresponds to $g$ in Figure 1 while $x$—$y$ corresponds to $g_2$ in Figure 6.

Instead of connecting the sections $g$ and $h$ directly across each other the energy can be made to pass from one to the other inductively through an intermediate transformer. Figure 8 shows such an arrangement in which a one-to-one through-transformer $p$ has its primary supplied by the section $h$, while its secondary in turn supplies the primary $g$ of the second transformer $d_2$. The points 1 and 4 are connected together. This has the advantage of utilizing the total voltages of the windings $e$, $g$ and 1—$a$ to make up the voltage of the system. In some systems the voltage of $g$ may not be negligible in comparison with that of $e$, and hence it may be desirable to add it to that of $e$ to obtain the highest possible voltage from the system.

A further modification of the system is shown in Figure 9. wherein 30 are the low tension windings which excite the two cores of the high tension transformers. A high tension winding 33 is placed on each core, the two windings 33 being connected in series and grounded at the mid-point. An additional winding is placed on each core comprising a coil 31 disposed opposite each coil 30 and a similar coil 32 connected in series with 31 and placed opposite the winding 33.

The winding 31—32 serves two purposes. One is a flux-shifting winding to compensate for flux leakage, as explained in the patent of Friedrich Dessauer. No. 1,372,653, above referred to and the other is a cage winding to fix the potential of the core.

The current flowing in 30 and that induced in 33 are in such directions as to produce opposed fields of force in the core, and such opposed fields cause a large amount of flux leakage. Thus all of the flux induced by the winding 30 is not available to produce current in 33. The winding 31, which may be of any desired number of turns, is placed on the same portion of the core as 30, hence all of the flux induced by 30 passes through 31 and induces a corresponding current therein. This same current flows through the winding 32, which is similar to 31, and thus induces in the opposite end of the core a flux equal to that induced by 30. As 32 is placed opposite 33, all of the flux induced by the former passes through the latter. Thus the same amount of flux flows in each end of the core and compensates for leakage.

We have found from experiment that if the winding 31—32 is intimately associated with the core, that is, is wound close to the core and so as to substantially envelop it, the winding will act as an electrostatic cage. Then if the winding be connected to some point of desired absolute potential, this potential will be imparted to the core by electrostatic induction. And it has been found that it does not matter whether another winding of different potential surrounds the core outside of the winding 31, 32. The latter acts as a shield and prevents any potential other than its own being impressed on the core. This electrostatic action, however, does not affect the electromagnetic action of any other winding. Hence the windings 30 and 33, while they do not affect the potential of the core, induce flux in it in the usual manner.

As shown in Figure 9, each cage-winding 31—32 is preferably connected to the mid-point of its winding 33, and the core has an absolute potential mid-way between that of the ground and $x$ or $y$.

Instead of arranging the windings 30 and 33 to constitute a through-transformer, they may be arranged to constitute an auto-transformer, as shown in Figures 10 and 11, and in the practical embodiment of the invention, as actually constructed, we prefer to use this form. All of the windings 30, 33 are connected directly in series, and the system is preferably grounded at its mid-point. The cage-windings 31, 32 are arranged in the same manner as in Figure 9.

One of the great advantages of the system is that it can be extended indefinitely to obtain any desired voltage, merely by the addition of units similar to the initial units of the system, and without providing any additional insulation. Figure 11 shows the modification of Figure 10 extended in such manner. The two transformers F constitute the system as shown in Figure 10. A succeeding transformer T, similar to F, has its primary 30' connected across a portion of the high tension winding 33 of each transformer F. A cage winding 31'—32 is connected to the mid-point of the high tension winding 33' and thus fixes the core at a potential midway between the ends of 33'. Thus the system has a voltage of four times that of 33', while each winding has to be insulated from the core for only a quarter of the voltage of the system.

It is to be understood that the invention is not limited to the particular details selected for the sake of illustration, but includes such changes and modifications as fall within the scope of the appended claims.

Having thus described the invention what is claimed as new and desired to be secured by Letters Patent is:

1. In a high tension transformer system, a plurality of transformers whose high tension windings are connected in series, means for exciting each succeeding transformer of the series from its preceding transformer, and means for maintaining the potential difference between the primary and secondary windings of each succeeding transformer less than the potential to earth of its high tension winding.

2. In a high tension transformer system, a plurality of transformers whose high tension windings are connected in series, means for exciting each succeeding transformer of the series from its preceding transformer and means for maintaining the potential difference between the core and the windings of each succeeding transformer less than that between the high tension winding and the earth.

3. In a high tension transformer system, a plurality of transformers whose high tension windings are connected in series, means for exciting each succeeding transformer of the series from its preceding transformer and means for maintaining the core of each succeeding transformer at an absolute potential less than the potential to earth of its secondary winding.

4. A plurality of auto transformers connected in series the low tension winding of each succeeding transformer of the series being connected across a portion of the high tension winding of the preceding transformer, and means for maintaining the potential difference between the primary and secondary windings of each succeeding transformer less than the potential between the high tension winding and the earth.

5. A plurality of auto transformers connected in series the low tension winding of each succeeding transformer of the series being connected across a portion of the high tension winding of the preceding transformer, and means for maintaining the potential difference between the windings and the core of each succeeding transformer less than the potential to earth of its high tension winding.

6. In a high tension transformer system, a plurality of transformers whose high tension windings are connected in series, means for exciting each succeeding transformer of the series from a portion of the high tension winding of the preceding transformer and means for determining the potential of the core of each transformer comprising an additional winding on the core connected to the tension winding.

7. In a high tension transformer system, a plurality of transformers whose high tension windings are connected in series, means for exciting each succeeding transformer of the series from a portion of the high tension winding of the preceding transformer, an additional winding on the core of each transformer comprising a coil associated with the primary, a similar coil connected in series therewith and associated with the secondary, and a connection between the additional winding and a point in the secondary winding.

8. In a high tension transformer system, a plurality of transformers whose high tension windings are connected in series, the low tension winding of each succeeding transformer of the series being excited from a portion of the high tension winding of its preceding transformer and means for maintaining the potential difference between the windings and the core of each transformer less than the potential to earth of its high tension winding.

9. In a high tension transformer system, in combination a plurality of cores, a high voltage winding and one or more low voltage windings inductively associated with each core, the high voltage windings being connected in series and a low voltage winding on each core being connected to supply current to a low voltage winding of the succeeding core of the series, and means for maintaining the absolute potential of each core at a value less than the potential of its high tension winding.

10. A transformer comprising a plurality of units, each of which comprises a winding, a terminal of one of said windings being grounded, and means for connecting a portion of each of said windings, except the last in the series, to a portion of the succeeding winding whereby the potential between the grounded terminal and the other terminal of the series of windings is the total potential of said winding less the potentials of the portions connected to the respective preceding windings.

11. An alternating-current transformer comprising a plurality of units, each of which comprises a core member and a winding thereon, each of said windings having a primary portion to which voltage may be applied and means whereby another portion of each of said windings, except the last in the series, is connected to the primary portion of the winding of the succeeding unit.

12. A transformer comprising a plurality of units, each of which comprises a winding having a primary portion to which potential may be applied and means whereby a portion of each of certain of said windings having high potential relatively to its primary portion is connected to the primary portion of the succeeding winding in the series.

13. A transformer comprising a series of similar auto-transformers, each of which has a core member insulated from the adjacent core members and a winding on said core member, a terminal portion of each of said windings constituting a primary winding and a portion adjacent to the other terminal of each of said windings, except the last in the series, constituting an exciting winding, and means for connecting the exciting windings to the respective primary windings of the succeeding auto-transformers whereby the potential across the main terminals of said transformer is the total of that of the auto-transformer windings less the potentials across the portions constituting exciting windings.

In testimony whereof we have signed our names to this specification in the presence of two subscribing witnesses.

WALDEMAR PETERSEN.
PROF. DR. FRIEDRICH DESSAUER.
EDUARD WELTER.

Witnesses:
ERNST WEILL,
CARL BILZ.